June 22, 1965  K. H. CARPENTER  3,190,184
WINDSHIELD CLEANING SYSTEM
Filed Aug. 20, 1962  4 Sheets-Sheet 1

INVENTOR.
KEITH H. CARPENTER
BY
*W. E. Finken*
HIS ATTORNEY

June 22, 1965 K. H. CARPENTER 3,190,184
WINDSHIELD CLEANING SYSTEM
Filed Aug. 20, 1962 4 Sheets-Sheet 2

INVENTOR.
KEITH H. CARPENTER
BY
W. E. Finken
HIS ATTORNEY

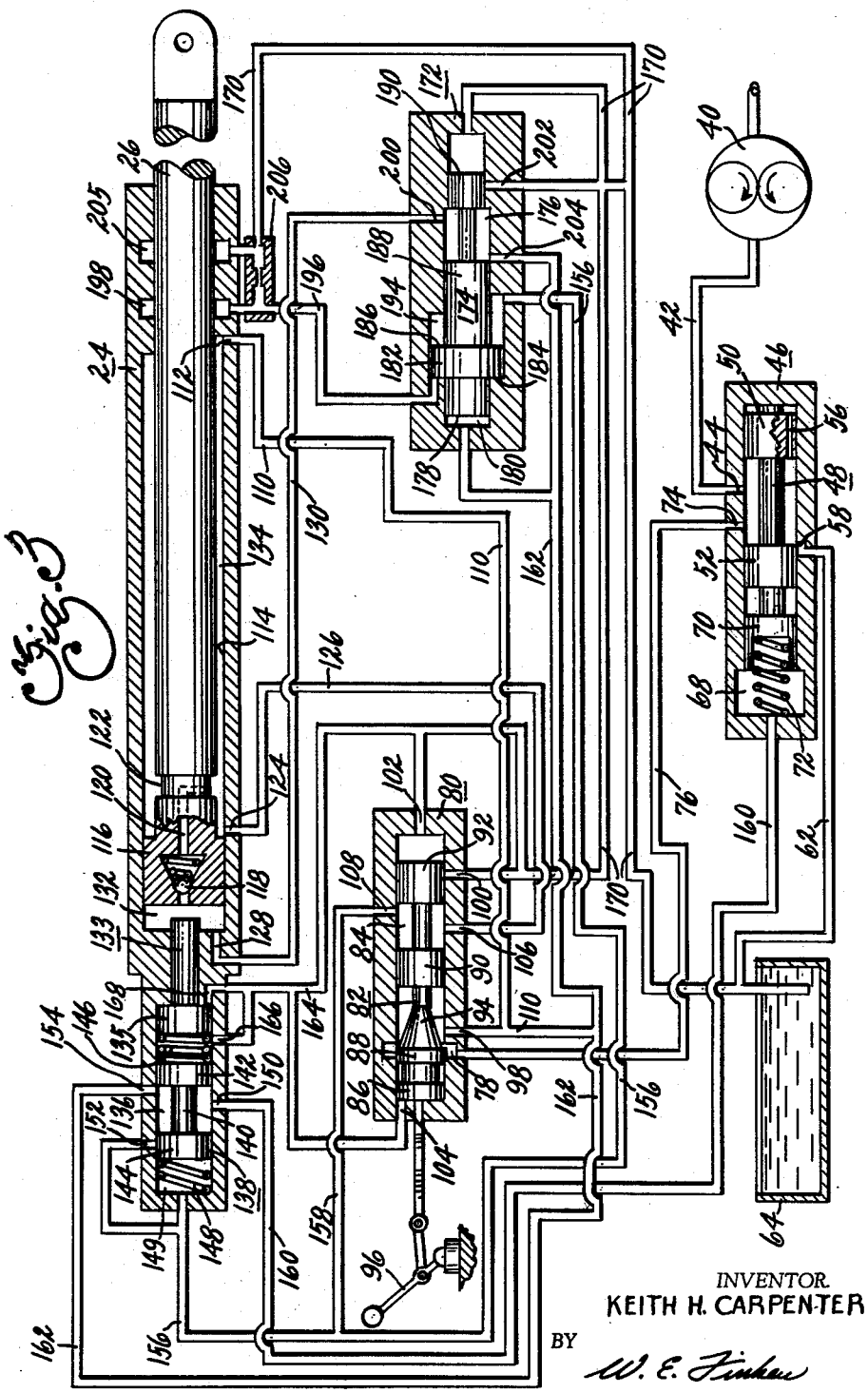
INVENTOR.
KEITH H. CARPENTER
BY *W. E. Finkan*
HIS ATTORNEY

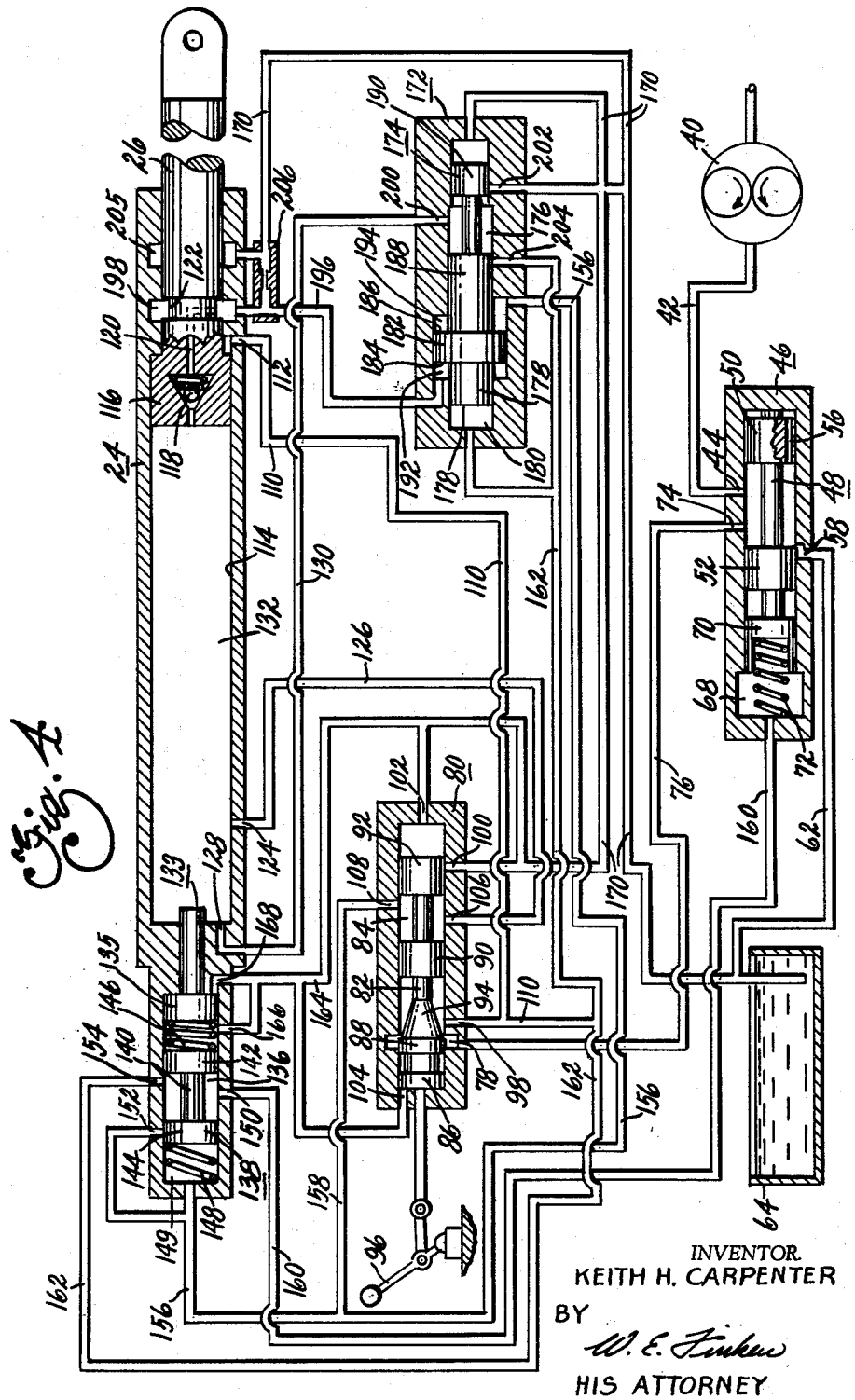

United States Patent Office 3,190,184
Patented June 22, 1965

3,190,184
WINDSHIELD CLEANING SYSTEM
Keith H. Carpenter, Pittsford, N.Y., assignor to General Motors Corporation, Detroit, Mich., a corporation of Delaware
Filed Aug. 20, 1962, Ser. No. 218,007
11 Claims. (Cl. 91—219)

This invention pertains to windshield cleaning systems, and particularly to an improved hydraulic system for actuating a wiper.

Heretofore, hydraulically operated windshield cleaning systems have been developed utilizing the bypass, or excess, hydraulic fluid from a vehicle driven accessory pump, such as the power steering pump. One of the disadvantages of previous systems is that the maximum load capability varies with wiper speed inasmuch as a common spring is utilized for positioning the flow control valve and the pressure regulator valve. In addition, this type of actuating system inherently results in blade chatter during low speed operation when the loads are high, such as when the windshield is in a tacky, or semiwet condition. The present invention relates to an improved hydraulic system wherein the speed control is independent of pressure regulating setting, and wherein higher rates of blade movement are coupled with varying periods of hesitation to substantially preclude blade chatter during slow speed operation.

Accordingly, among my objects are the provision of a hydraulically operated windshield cleaning system including a motor having a differential area piston which is continuously pressurized in one direction; the further provision of a system of the aforesaid type including a load responsive pressure regulator valve and means for automatically unloading the pressure regulator valve when the wiper motor is parked; the further provision of a system of the aforesaid type including a differential area, servo actuated directional control valve, and the still further provision of a hydraulically operated windshield wiper system including means for causing the piston to dwell, or hesitate, at one stroke end position for time intervals which vary inversely with the speed setting of the manual control valve.

The aforementioned and other objects are accomplished in the present invention by continuously pressurizing the motor chamber having the smaller piston area exposed thereto and alternately connecting the opposed motor chamber to pressure and drain to control the direction of piston movement. Specifically, the hydraulic system includes a manual control valve for controlling the rate of flow to the motor to control motor speed and for interrupting operation of the wiper motor and arresting movement of the motor piston in a parked position beyond its normal inboard stroke end position. The wiper motor piston actuates an unloading valve connected with the pressure regulator valve for automatically reducing the load on the pressure regulating valve when the wiper motor is not in use. The servo actuated directional control valve is hydraulically connected to the motor so as to be actuated when the motor piston arrives at its normal stroke end positions.

Further objects and advantages of the present invention will be apparent from the following description, reference being had to the accompanying drawings, wherein a preferred embodiment of the present invention is clearly shown and wherein similar numerals depict similar parts throughout the several views.

In the drawings:

FIGURE 3 is a schematic view similar to FIGURE 2 with the wiper motor shown in its normal inboard stroke end position.

FIGURE 4 is a schematic view similar to FIGURE 2 with the wiper motor shown in its outboard stroke end position.

Figure 1:
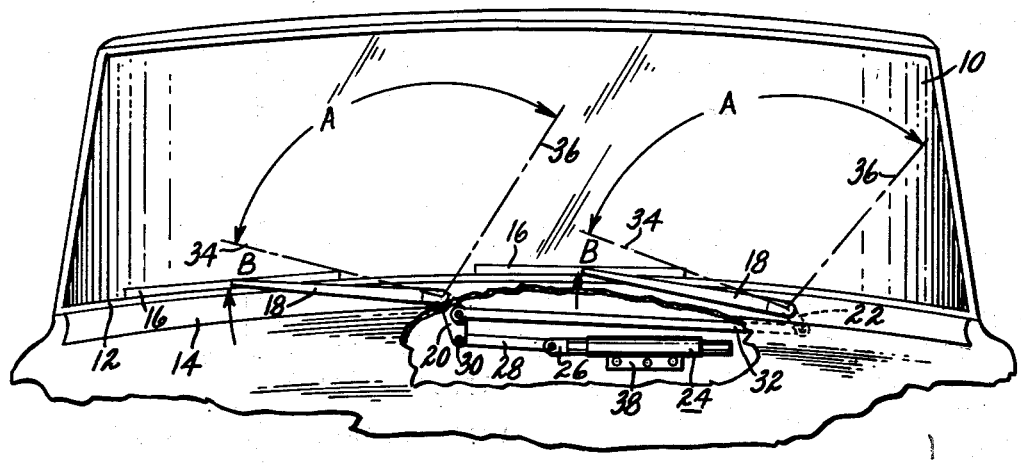
FIGURE 1 is a fragmentary view, in elevation, with certain parts broken away, of a vehicle equipped with the windshield cleaning system of this invention.

Referring to FIGURE 1, the improved windshield cleaning system is shown in combination with a vehicle having a windshield 10 with a lower reveal molding 12 and a cowl 14. A pair of spaced wiper blades 16 are movable in phase across the outer surface of the windshield 10, the blades 16 being carried by wiper arms 18 having spring-hinge connected inner and outer sections. The wiper arms 18 are drivingly connected to spaced pivot shafts, not shown, which project through the cowl 14, the left hand pivot shaft having a substantially triangular drive arm 20 attached thereto and the right hand pivot shaft having a drive arm 22 attached thereto. A wiper motor 24 is suitably attached to the vehicle beneath the cowl 14, the wiper motor being of the reciprocating type and having a rod 26 pivotally connected to one end of a drive link 28. The drive link 28 is pivotally connected at 30 to the triangular drive arm 20 for imparting oscillation to the left hand blade and arm assembly, the drive arm 20 being connected to the drive arm 22 by a second link 32 so as to drive the right hand blade and arm assembly in synchronism with the left hand blade and arm assembly.

The stroke of the motor 24 is such as to oscillate the blades 16 throughout a running stroke having an angle A between predetermined inboard stroke end positions 34 and outboard stroke end positions 36. In addition, the wiper motor 24 is capable of moving the wiper blades 16 beyond their normal inboard stroke end positions 34 to depressed park positions through the angle B whereat the wiper blades firmly engage the lower reveal molding 12 of the windshield. The cylinder of the wiper motor 24 is formed as an integral part of a housing 38 which enclosed component parts of the hydraulic control ssytem.

Figure 2:
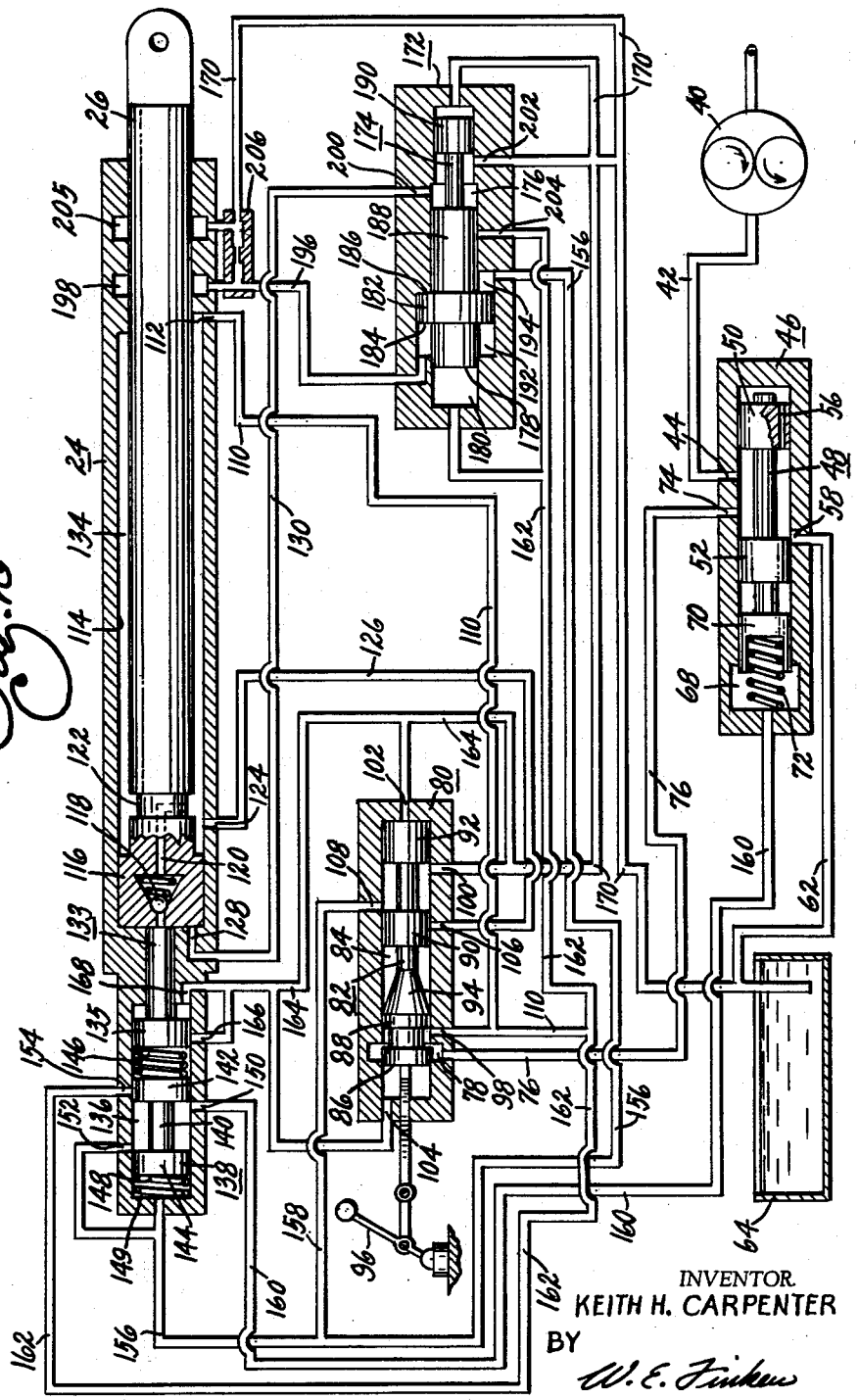
FIGURE 2 is a schematic diagram of the improved hydraulic control system with the wiper motor shown in the parked position.

Referring to FIGURE 2, the hydraulic control system utilizes excess, or bypass, flow produced by a vehicle driven accessory pump 40, which may be the power steering pump. In one of the known types of power steering systems including an open center valve, the metered flow from the pump 40 is diverted to an exhaust port of the power steering control valve, and the present invention comprehends the use of a conduit 42 interconnecting this exhaust port and an input port 44 of a pressure regulator valve 46 located in the housing 38. The pressure regulator valve 46 comprises a reciprocable valve spool 48 having spaced lands 50 and 52. The land 50 has an axial passage 56 therethrough which permits the flow of hydraulic fluid to the right hand side of the land 50 for biasing the spool 48 to the left. The land 52 controls a pressure relief port 58 connected by conduit 62 to a sump 64, or reservoir, to which the intake of the pump 40 is connected.

The pressure regulator valve 46 also includes a servo chamber 68 to which a piston head 70, integral with the valve spool 48, is exposed. The head 70 is engaged by one end of a coil spring 72, the other end of which engages the valve housing. The spring 72 biases the valve spool 48 to the right. When the wiper motor is not in use the spring 72 determines the relief setting of the pressure regulator valve since it is only the spring 72 which opposes movement of the spool 48 to the left so as to maintain a minimum pressure at the output port 74 of the pressure regulator valve and the passage 76 connected thereto.

The passage 76 is connected to the inlet port 78 of a manual control valve 80. The manual control valve comprises a plunger 82 disposed in a valve bore 84 and having axially spaced lands 86, 88, 90 and 92, the land 88 including a frusto conical throttling surface 94. The plunger 82 is shown connected to a manually operable lever 96.

The manual control valve 80 includes an outlet port 98, drain ports 100, 102 and 104, and control ports 106 and 108. The outlet port 98 is connected by a housing passage 110 to a rod end port 112 of the wiper motor 24. The wiper motor 24 includes a cylinder bore 114 having a reciprocable piston 116 disposed therein, the piston being integral with the axially extending rod 26 which extends outside of the housing 38. The head of the piston 116 carries a spring biased check valve 118 which normally closes a passage 120 that terminates in an annular groove 122 of the piston rod 26. A control port 124 communicates with the cylinder bore 114 adjacent the head end thereof, the control port 124 being connected by a housing passage 126 to the control port 106 of the manual control valve 80. The head end port 128 for the wiper motor is connected to a housing passage 130.

As seen more particularly in FIGURE 3, the piston 116 divides the cylinder bore 114 into a head end chamber 132 and a rod end chamber 134, the piston having differential areas exposed to the chambers. It is evident that the area of the piston 116 exposed to the chamber 132 is greater than the area of the piston exposed to the chamber 134. The rod end chamber 134 is continuously pressurized from the hydraulic supply through port 112, passage 110 and port 98.

The piston is shown in the parked position in FIGURE 2 whereat it engages the end of the cylinder bore 114 and the rod end of a plunger 133 having a head 135 disposed in a valve bore 136. The valve bore 136 contains an unloading valve 138 comprising a spool 140 having spaced lands 142 and 144. A first coil spring 146 is disposed between the head 135 of the plunger 133 and the land 142, and a second coil spring 148 is disposed in servo chamber 149 between the land 144 and the end of the valve bore 136. When the wiper motor piston 116 is in its parked position thereby depressing the plunger 133, the spring 146 is compressed and effects movement of the spool 140 to the position shown in FIGURE 2 whereat ports 150 and 152 of the unloading valve 138 are interconnected by the annular groove between lands 142 and 144, and port 154 is blocked.

The port 152 of the unloading valve 138 is connected to a passage 156 having communication with the servo chamber 149 to the left of the land 144, the passage 156 being connected to passage 158 that connects with the control port 108 of the manual control valve 80. The port 150 is connected to passage 160 which communicates with servo chamber 68 of the pressure regulator valve 46.

The port 154 is connected to passage 162. Drain ports 102 and 104 of the manual control valve 80 are connected with a passage 164 which communicate with drain ports 166 and 168 of the valve bore 136, and drain passage 170 connected to the port 100 and the sump 64.

Passage 162 interconnects the unloading valve 138 with reversing valve means comprising a servo actuated directional control valve 172. Passage 162 is also connected with the passage 110 leading from the control port 98 of the manual control valve 80. The directional control valve 172 comprises a plunger 174 disposed in a stepped valve bore 176. The plunger 174 has a circular piston surface 178 exposed to a servo chamber 180, a shoulder 182 having opposed annular piston surfaces 184 and 186 with equal areas greater than the piston surfaces 178, and control lands 188 and 190. The annular piston surface 184 is exposed to a servo chamber 192 and the annular piston surface 186 is exposed to a servo chamber 194.

Servo chamber 180 is connected to the passage 162 and hence is pressurized at all times. Servo chamber 192 is connected to a passage 196 that communicates with an annular groove 198 in the rod end of the motor cylinder. Servo chamber 194 is connected to the passage 156.

The passage 130 for the head end motor port 128 is connected to port 200 of the directional control valve 172, and the drain passage 170 is connected to drain port 202 of the directional control valve. The passage 162 is connected to pressure port 204 of the directional control valve. The right hand end of the valve bore 176 is connected to the drain passage 170.

Drain passage 170 is also connected with a second annular groove 205 of the motor cylinder, the annular groove 205 being axially spaced from the annular groove 198. The passages 196 and 170 are connected through a restriction 206, the purpose of which will be described hereinafter.

When the control valve is moved from the "off," or "park," position shown in FIGURE 2 to the "on" position of FIGURE 3, it can be seen that control port 108 is disconnected from the drain port 100 and connected with the control port 106 through the annular groove between lands 90 and 92. In this manner hydraulic fluid under pressure from the rod end chamber 134 is permitted to flow through port 124 and passage 126, ports 106 and 108, and passages 158 and 156 to servo chamber 149 and thus move the unloading valve spool 140 from the position of FIGURE 2 to the position of FIGURE 3. The unloading valve spool 140 is servo actuated to interconnect ports 150 and 154 while land 144 blocks port 152. Since port 154 is connected to passage 162 and is thus subject to hydraulic fluid under pressure equal to that in the rod end chamber 134 by reason of its connection with passage 110, the interconnection of ports 154 and 150 results in pressurization of the servo chamber 68 in the pressure regulator valve 46 through passage 160. Pressurization of the servo chamber 68 increases the relief setting of the pressure regulator valve in accordance with the load demands of the wiper system.

At the same time, the servo chamber 194 is pressurized from passages 158 and 156 while the servo chamber 192 remains connected to drain through passage 196, restriction 206 and passage 170. Since the area of piston surface 186 is greater than the area of piston surface 178 exposed to servo chamber 180, and since the pressure potentials in the chambers 194 and 180 are substantially the same, the directional control valve plunger 174 will begin moving to the left. As the directional control valve plunger 174 moves to the left, land 188 uncovers port 204 and land 190 blocks port 202, thereby interconnecting ports 204 and 200 so as to pressurize the head end chamber 132 from passage 162 through ports 204 and 200, and passage 120 and port 128. The directional control valve plunger 174 will be moved to, and remain in, the extreme left hand position throughout the extending stroke of the motor piston 116. The rod end chamber 134 remains pressurized from port 98, passage 110 and port 112 but since the head end of the piston 116 is of greater area than the rod end, and since the pressure potentials in the exposed chambers are substantially the same, the piston 116 will begin moving to the right. Initial movement of the piston 116 to the right will release the plunger 133 and permit it to move under the urge of spring 146 from the position of FIGURE 2 to the position of FIGURE 3 whereat the rod end portion of the plunger 133 is disposed within the cylinder chamber 132. The spring-biased check valve 118 will remain closed during movement of the piston 116 to the right under the urge of its spring since the pressure potentials on opposite sides thereof are substantially equal. During movement of the piston 116 to the right, the hydraulic fluid in the chamber 134 is forced back into the system under pressure, and thus the system is regenerative on the extend stroke of the wiper motor.

When the piston 116 reaches its maximum extended position as shown in FIGURE 4, the annular groove 122 of the piston rod 26 is aligned with the annular groove 198 in the cylinder. As the groove 198 is always connected to the drain passage through restriction 206, the check valve 118 will open allowing hydraulic fluid under pressure from the cylinder chamber 132 to flow through the piston passage 120, and thence through grooves 122 and 198 to the passage 196. This hydraulic fluid will pressurize the servo chamber 192 of the directional control valve, notwithstanding the restriction 206 which connects passage 196 with drain passage 170, and thus initiate movement of the plunger 174 to the right since the opposed equal area piston surfaces 184 and 197 are exposed to the same pressure potential while the piston surface 178, likewise subject to pressure, produces the dominating force to impart movement to the plunger 174. As the directional control valve plunger 174 moves to the right, land 188 will block port 204, and the land 190 will open port 202, thus interconnecting ports 200 and 202. Since port 202 is connected to the drain passage 170, the head end chamber 132 will be connected to drain through port 128, passage 130, ports 200 and 202 and the passage 170. Likewise, servo chamber 194 of the directional control valve 172 will be connected to drain through passages 156 and 158, ports 108 and 106, passage 126 and ports 124 and 128. The piston 116 will then move to the left, or initiate its retract stroke, since the rod end chamber 134 remains pressurized through passage 110 and port 112. The directional control valve plunger 174 will be moved to, and remain in its extreme right hand position throughout the retracting stroke of the motor piston 112, even though the pressure in servo chamber 192 is bled to drain through the restriction 206 between passages 196 and 170.

When the piston 116 reaches the position shown in FIGURE 3 wherein the port 124 is uncovered, movement of the piston 116 to the left will be arrested thus determining the normal retracted stroke end position of the motor piston.

During movement of the piston 116 between the position of FIGURE 4 and the position of FIGURE 3, port 124 and passage 126 are connected to drain through the motor chamber 132 and the port 128, except for the time when the piston head blocks the port 124. At this time the servo chamber 149 of the unloading valve is connected to drain. When the port 124 is uncovered by the piston head 116, it is immediately pressurized by the rod end chamber 134 thus pressurizing the passage 126 and the passages 158 and 156 through ports 106 and 108 of the manual control valve. As passage 156 is connected to the servo chamber 194 of the directional control valve, the directional control valve plunger 174 begins moving to the left so as to again reverse the direction of movement of the motor.

The phenomenon termed "hesitation" occurs at this inboard stroke end position of the piston 116 as shown in FIGURE 3, since a certain time interval is required to repressurize the unloading valve chamber 149. Moreover, since the rod end chamber 134 is continuously pressurized, pressure must be built up in the head end chamber 132 sufficient to overcome the pressure in the rod end chamber 134 and the load imposed on the motor by the cleaner assemblies comprising the wiper blades and wiper arms.

Figure 5:
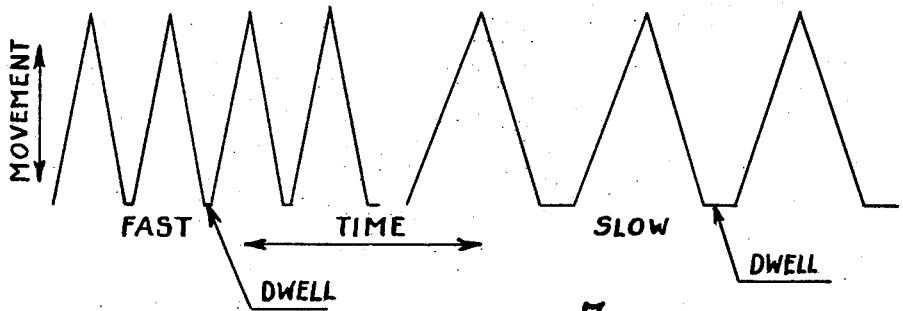
FIGURE 5 is a graph depicting the relative time intervals of hesitation and motor movement at different speed settings.

The hesitation interval will vary inversely with the speed setting of the manual control valve, that is, the time interval required to repressurize the unloading valve and the head end chamber 132 of the wiper motor will increase as the flow through port 98 is throttled by the metering surface 94. Consequently, in a given installation the hesitation intervals may comprise nine percent of the total cyclic time at the wide open position of the manual control valve, and in excess of twenty percent of the total cyclic time at a one-fourth wide open position of the manual control valve. This phenomenon inherently tends to preclude blade chattering at low speed settings since the wiper blades move at a greater velocity than would be normal for such a speed setting if the hesitation interval between cycles did not exist. The hesitation phenomenon is graphically depicted in FIGURE 5 and only occurs at the normal retract stroke end position of the wiper motor piston. Movement of the motor piston is reversed substantially instantaneously at the extend stroke end position of the wiper piston due to the continuous pressurization of the rod end motor chamber.

As alluded to hereinbefore, the stroke of the wiper motor piston 116 is extended in order to move the wiper blades to their depressed park positions. Automatic parking is achieved when the manual control valve 80 is moved to the extreme right hand "park" position as shown in FIGURE 2 whereat the land 90 of the plunger 82 blocks the port 106 and hence the passage 126 and the control port 124, at the same time interconnecting ports 100 and 108 so as to connect passages 158 and 156 to drain. This will result in immediate movement of the directional control valve plunger 174 to the position shown in FIGURE 2, thus causing the motor piston 116 to retract due to connection of the head end chamber 132 to drain. Movement of the piston 116 will continue until it is arrested by the head end of the cylinder thus depressing the plunger 133 to move the unloading valve plunger 138 through spring 146 to the position shown in FIGURE 2 so as to depressurize the servo chamber 68 of the pressure regulating valve 46. The rod end chamber 134 of the wiper motor remains pressurized under a relatively low pressure as determined by the setting of the relief valve spring 72 within the pressure regulator valve so as to maintain the motor piston and the wiper blades in their parked positions.

One of the important features of the present invention relates to the fact that leakage across the motor piston will not seriously impair operation of the wiper motor. This is true since during extending movement of the motor piston both motor chambers are subjected to substantially the same pressure, and piston movement is effected by the differential areas exposed to such pressure. During retracting movement of the piston, the rod end chamber remains fully pressurized while the head end chamber is connected to drain. As long as leakage across the piston does not exceed the maximum output of the hydraulic supply the piston will continue to move toward the rod extended position when the manual control valve is open, and will automatically move to and be retained in the retracted position when the manual control valve is moved to the "park" position.

While the embodiment of the invention as herein disclosed constitutes a preferred form, it is to be understood that other forms might be adopted.

What is claimed is as follows:

1. A hydraulically operated windshield wiper actuating system including, a source of hydraulic fluid under pressure, pressure regulating means for controlling the pressure potential of said source comprising a spring loaded relief valve and a servo piston disposed in a servo chamber for varying the load on said spring, a wiper motor having a differential area reciprocable piston, a manual control valve for throttling the flow of hydraulic fluid to said motor and for continuously pressurizing the smaller area of said motor piston, valve means connecting said servo chamber and said wiper motor for loading said spring in accordance with the demands of said motor, servo actuated reversing valve means controlled by movement of said piston for alternately subjecting the larger piston area to drain and pressure to reciprocate said piston, and means actuated by said piston for moving said valve means to connect said servo chamber to drain when movement of said piston is arrested by positioning said manual control valve in the "off" position.

2. A hydraulically operated windshield wiper actuating system including, a wiper motor having a cylinder, a reciprocable piston disposed in said cylinder and dividing said cylinder into opposed chambers and having unequal areas exposed to said chambers, a source of hydraulic fluid under pressure, a manual control for throttling the flow of hydraulic fluid to said motor and for continuously pressurizing the motor chamber exposed to said smaller piston area, servo actuated reversing valve means controlled by piston movement to alternately subject the other motor chamber to pressure and drain so as to reciprocate said piston throughout a running stroke, and means operable to disable said reversing valve means and connect said other motor chamber to drain upon movement of said manual control valve to an "off" position so as to extend the stroke of said motor piston beyond one end of said running stroke by continued pressurization of said motor chamber exposed to said smaller piston area and arrest movement thereof.

3. A hydraulically operated windshield wiper actuating system including, a wiper motor having a cylinder with a differential area reciprocable piston therein, said piston dividing said cylinder into a rod end chamber exposed to the smaller piston area and a head end chamber exposed to the larger piston area, a source of hydraulic fluid under pressure, a manual control valve for throttling the flow of hydraulic fluid to said motor and for continuously pressurizing said rod end chamber, servo actuated reversing valve means controlled by piston movement for alternately subjecting said head end chamber to pressure and drain to reciprocate said piston throughout a running stroke, and manual means operable to disable said reversing valve means and connect the head end chamber to drain upon movement of said manual control valve to an "off" position so as to extend the stroke of said motor piston beyond one end of said running stroke by continued pressurization of said rod end chamber and arrest movement thereof.

4. A hydraulically operated windshield wiper actuating system including, a wiper motor having a cylinder with a differential area reciprocable piston therein, said piston dividing said cylinder into a rod end chamber exposed to the smaller piston area and a head end chamber exposed to the larger piston area, a source of hydraulic fluid under pressure, a manual control valve for throttling the flow of hydraulic fluid to said motor and for continuously pressurizing said rod end chamber, servo actuated reversing valve means controlled by piston movement for alternately subjecting said head end chamber to pressure and drain to reciprocate said piston throughout a running stroke comprising a reciprocable plunger having a first piston surface of smaller area than a pair of exposed equal area piston surfaces and means continuously subjecting said first piston surface to hydraulic fluid under pressure, and manual means operable to disable said reversing valve means and connect the head end chamber to drain upon movement of said manual control valve to an "off" position so as to extend the stroke of said motor piston beyond one end of said running stroke by continued pressurization of said rod end chamber and arrest movement thereof.

5. A hydraulically operated windshield wiper actuating system including, a wiper motor having a cylinder with a differential area reciprocable piston therein, said piston dividing said cylinder into a rod end chamber exposed to the smaller piston area and a head end chamber exposed to the larger piston area, a source of hydraulic fluid under pressure, a manual control valve for throttling the flow of hydraulic fluid to said motor and for continuously pressurizing said rod end chamber, servo actuated reversing valve means controlled by piston movement for alternately subjecting said head end chamber to pressure and drain to reciprocate said piston throughout a running stroke comprising a reciprocable plunger having a first piston surface of smaller area than a pair of opposed equal area piston surfaces and means continuously subjecting said first piston surface to hydraulic fluid under pressure, said opposed piston surfaces of equal area being alternately connected to pressure and drain adjacent the ends of the running stroke of said motor piston to reciprocate said plunger and alternately connect the head end chamber to pressure and drain, and manual means operable to disable said reversing valve means and connect the head end chamber to drain upon movement of said manual control valve to an "off" position so as to extend the stroke of said motor piston beyond one end of said running stroke by continued pressurization of said rod end chamber and arrest movement thereof.

6. The system set forth in claim 4 wherein said motor piston has a passage therethrough interconnecting said rod and head end chambers, and a spring biased check valve for normally closing said passage.

7. The system set forth in claim 6 wherein said motor piston includes a rod having an annular groove, wherein said motor piston passage connects with said annular groove, and wherein said cylinder includes an annular groove surrounding said piston rod and spaced axially outward from said rod end chamber, said piston rod groove and said cylinder groove being aligned at the other end of said running stroke so as to permit the flow of hydraulic fluid from said head end chamber through said motor piston passage and said check valve to said cylinder groove for actuating said reversing valve means in one direction.

8. The system set forth in claim 7 wherein said cylinder includes a port spaced axially inward from the head end thereof, and means connecting said port with said reversing valve means adjacent said one end of the running stroke of the motor piston for actuating said reversing valve means in the other direction.

9. The system set forth in claim 8 wherein said last recited means includes said manual control valve whereby movement of said manual control valve to the "off" position interrupts the connection between said cylinder port spaced axially inward of the head end thereof and said reversing valve means to disable said reversing valve means.

10. A hydraulically operated windshield wiper actuating system including, a wiper motor having a cylinder with a differential area reciprocable piston therein, said piston dividing said cylinder into a rod end chamber exposed to the smaller piston area and a head end chamber exposed to the larger piston area, a source of hydraulic fluid under pressure, a manual control valve for throttling the flow of hydraulic fluid to said motor and for continuously pressurizing said rod end chamber, pressure regulating means for said source of hydraulic fluid under pressure for controlling the pressure potential thereof comprising a spring biased relief valve and a servo actuating piston for varying the load on said spring, a servo actuated unloading valve for controlling the connection of said servo piston to said motor chambers to regulate the pressure potential of said hydraulic supply in accordance with the demands of said motor, and manual means operable to disable said reversing valve means and connect the head end chamber to drain upon movement of said manual control valve to an "off" position so as to extend the stroke of said motor piston beyond one end of said running stroke by continued pressurization of said rod end chamber and arrest movement thereof.

11. The system set forth in claim 10 including a motor piston operated plunger extending into said head end chamber for moving said unloading valve to a position whereat said servo piston is connected to drain when movement of said motor piston is arrested.

References Cited by the Examiner
UNITED STATES PATENTS

| | | | |
|---|---|---|---|
| 622,576 | 4/99 | Waugh | 99—300 |
| 1,964,196 | 6/34 | Cuttat | 91—448 |
| 2,000,805 | 5/35 | West et al. | 91—283 |
| 2,298,197 | 10/42 | Coffey | 15—250.16 |
| 2,406,747 | 9/46 | Davis | 91—321 |
| 2,629,363 | 2/53 | McClay | 91—321 |
| 2,726,642 | 12/55 | Zinty et al. | 91—283 |
| 2,729,941 | 1/56 | Rose et al. | 91—300 |
| 2,770,222 | 11/56 | Anderson | 91—356 |
| 2,789,544 | 4/57 | Dermond | 91—225 |
| 2,869,165 | 1/59 | Dermond | 91—225 |
| 2,882,545 | 4/59 | Kelley et al. | 91—283 |
| 3,007,451 | 11/61 | Washburn et al. | 91—303 |
| 3,053,234 | 9/62 | Chevreux | 91—31 |

FRED E. ENGELTHALER, *Primary Examiner*.

SAMUEL LEVINE, *Examiner*.